United States Patent
Yoshimoto et al.

(10) Patent No.: US 7,476,012 B2
(45) Date of Patent: Jan. 13, 2009

(54) VEHICLE INTERIOR LIGHTING SYSTEM

(75) Inventors: Masayuki Yoshimoto, Toyoake (JP); Katsuhiro Ogawa, Obu (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 0 days.

(21) Appl. No.: 11/438,307

(22) Filed: May 23, 2006

(65) Prior Publication Data
US 2006/0268536 A1 Nov. 30, 2006

(30) Foreign Application Priority Data
May 24, 2005 (JP) ............................. 2005-150422

(51) Int. Cl.
*B60Q 1/00* (2006.01)
*G01D 11/28* (2006.01)

(52) U.S. Cl. ........................................ 362/488; 362/29

(58) Field of Classification Search .................. 362/23, 362/28, 29, 30, 471, 482, 487, 488, 489, 362/459, 547; 180/90; 280/752; 296/37.8, 296/37.9; 224/483, 281; 131/234, 238
See application file for complete search history.

(56) References Cited

U.S. PATENT DOCUMENTS 6,347,880 B1 * 2/2002 Furst et al. ................. 362/494
7,063,447 B2 * 6/2006 Andrieu et al. ............. 362/488
2002/0093826 A1 * 7/2002 Bos et al. ................... 362/494
2004/0134503 A1 * 7/2004 Windorfer et al. .......... 131/231
2006/0034092 A1 * 2/2006 Okazaki et al. ............. 362/489

FOREIGN PATENT DOCUMENTS

| DE | 3236327 A1 | * | 5/1983 |
| FR | 2720039 A1 | * | 11/1995 |
| JP | 2-264 U | | 1/1990 |
| JP | 2000198380 A | * | 7/2000 |
| JP | 2000355250 A | * | 12/2000 |
| JP | 2005112169 A | * | 4/2005 |

* cited by examiner

*Primary Examiner*—Jong-Suk (James) Lee
*Assistant Examiner*—David R Crowe
(74) *Attorney, Agent, or Firm*—Birch, Stewart, Kolasch & Birch, LLP

(57) ABSTRACT

A lighting system comprising: an instrument panel having an ashtray and a cigar lighter placed parallel therein in a vehicle width direction; a light emitter; a bulb case extending in the vehicle width direction on a rear surface of the instrument panel above the ashtray and the cigar lighter, and accommodating the light emitter; and a plurality of slits provided in the instrument panel above the ashtray and the cigar lighter, and facing an opening portion of the bulb case, the light emitter being disposed above the slits.

6 Claims, 4 Drawing Sheets

VEHICLE INTERIOR LIGHTING SYSTEM

BACKGROUND OF THE INVENTION

1. Field of the Invention

This invention relates to a vehicle interior lighting system and, more particularly, a lighting system for lighting an ashtray, a cigar lighter, and a console in a vehicle.

2. Description of the Related Art

In installing lighting on an ashtray, a cigar lighter, or a console, it has been common practice to provide bulbs, one bulb for each of the ashtray, the cigar lighter, and the console, so that each of them has dedicated lighting individually.

There is a conventional lighting system for an ashtray and a cigar lighter in which the ashtray and the cigar lighter having a translucent lighting ring are placed parallel in a vehicle width direction. Rearwardly of the lighting ring, a translucent light receiving portion and a light emitter are disposed. The light emitter is located rearwardly of the translucent light receiving portion, and at an intermediate position between the translucent light receiving portion and a side surface of the ashtray to throw light toward the translucent light receiving portion and an opening surface of the ashtray. In such a lighting system, a louver-shaped polarization filter for allowing light incident on a forward portion to pass toward the opening surface of the ashtray is disposed at a position oblique in the vehicle width direction to head forwardly from a side of the light emitter facing the ashtray (see, for example, Japanese Utility Model Application Laid-Open No. 1990-264).

According to Japanese Utility Model Application Laid-Open No. 1990-264, the disposition of the louver-shaped polarization filter, because of its incident angle characteristics, prevents leakage of direct light from the ashtray, or leakage of light from a clearance between the side surface of the ashtray and the side surface of a center cluster. Thus, appearance is improved, and these types of light can be effectively used for lighting the translucent lighting ring of the cigar lighter.

However, the above-described conventional lighting system needs to provide the cigar lighter with the lighting ring, and has to switch on lighting whenever there is used the console extending in the longitudinal direction of the vehicle below the ashtray and the cigar lighter, and having a storage compartment, etc. provided therein. These have been minimally convenient, for example, in the nighttime.

The present invention has been accomplished in light of the above-described problems. It is an object of the invention to provide a lighting system capable of improving convenience with a simple configuration.

SUMMARY OF THE INVENTION

An aspect of the present invention, for attaining the above object, is a lighting system comprising an instrument panel having an ashtray and a cigar lighter placed parallel therein in a vehicle width direction, a light emitter, a bulb case extending in the vehicle width direction on a rear surface of the instrument panel above the ashtray and the cigar lighter, and accommodating the light emitter, and a plurality of slits provided in the instrument panel above the ashtray and the cigar lighter, and facing an opening portion of the bulb case, the light emitter being disposed above the slits.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The best mode for carrying out the present invention will be described in detail by the following embodiment with reference to the accompanying drawings:

Embodiment

Figure 1:
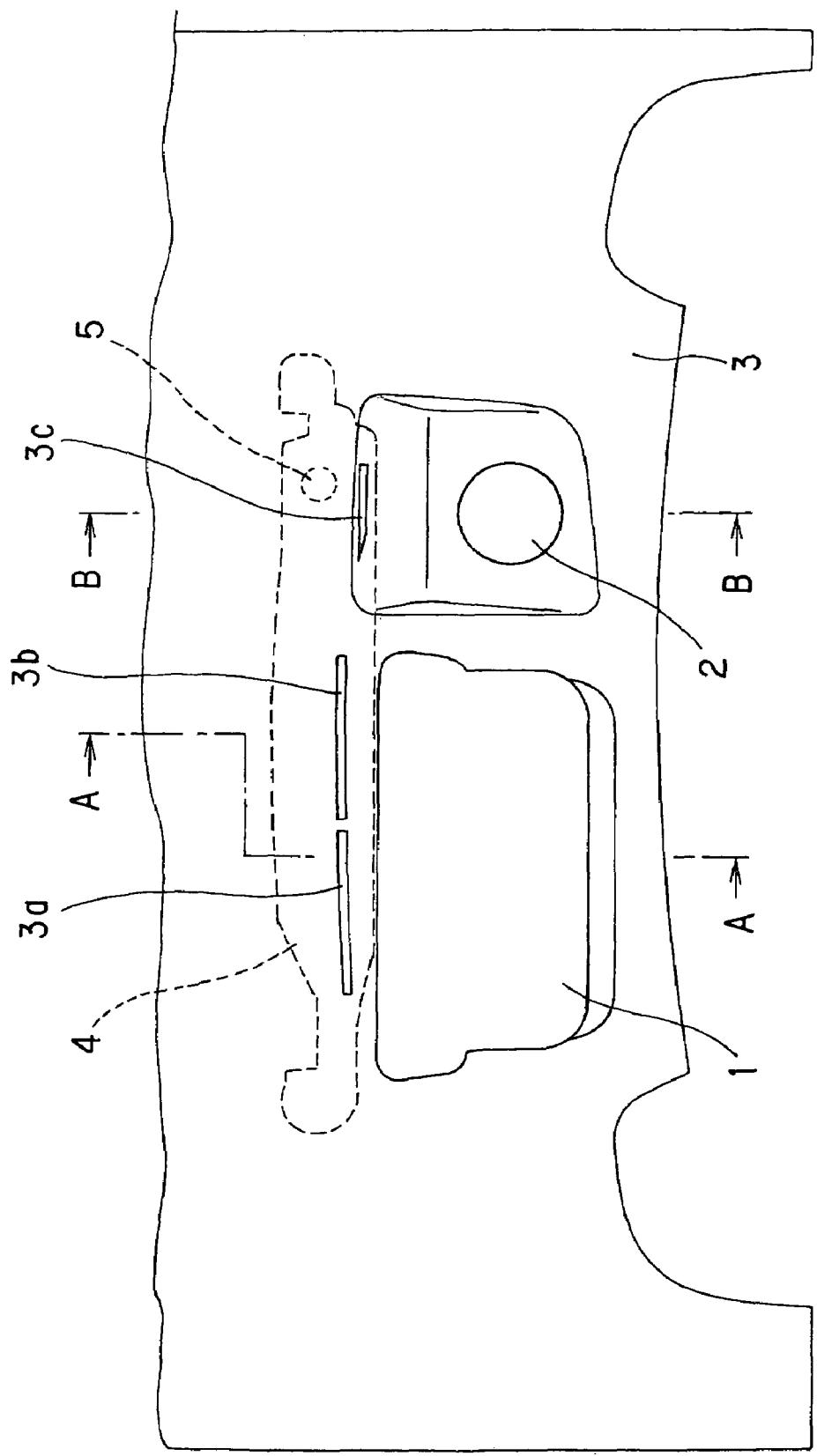
FIG. 1 is a front view showing the configuration of an embodiment of the present invention.

An embodiment of a lighting system according to the present invention will be described based on FIG. 1. As shown in FIG. 1, an ashtray 1 and a cigar lighter 2 are placed parallel in a vehicle width direction in a center lower panel 3. Slits 3a, 3b and 3c are provided above the ashtray 1 and the cigar lighter 2 of the center lower panel 3, and the slits 3a and 3b have the same slit width, while the slit 3c is set to have a slit width slightly larger than the slit width of the slits 3a and 3b.

A bulb case 4 is provided on the rear surface of the center lower panel 3 so as to cover the slits 3a, 3b and 3c. The bulb case 4 has an inner surface rendered white by painting or by coloring with a raw material, and accommodates a bulb 5, as a light emitter, above the slit 3c. The bulb 5 is always lit while a light switch is on.

Figure 2:
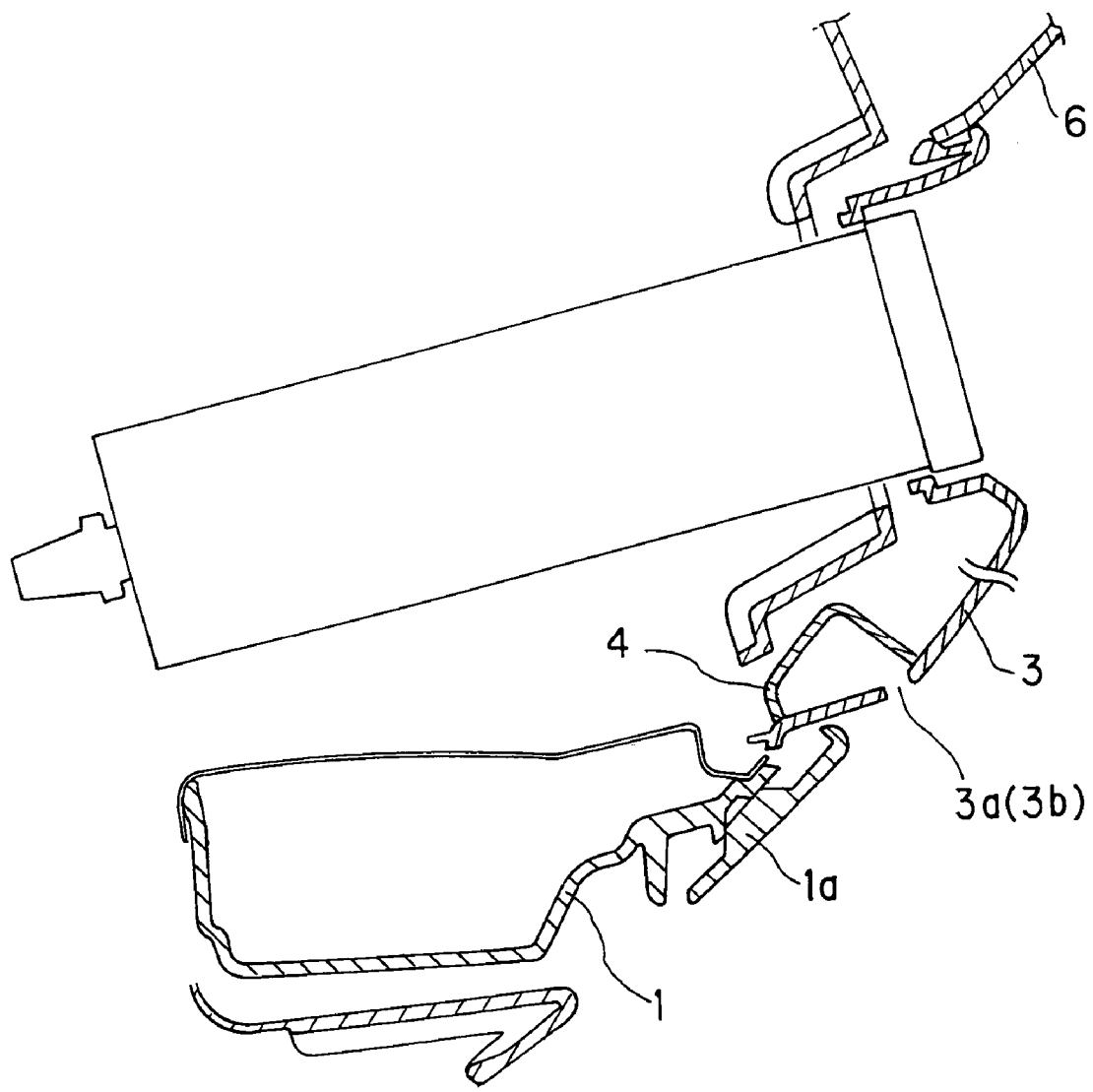
FIG. 2 is a sectional view taken on line A-A in FIG. 1.

As shown in FIG. 2, a section of the center lower panel 3 in the vicinity of the ashtray 1 is of a shape having convexities and concavities. The ashtray 1 is installed at a position concave toward a front of a vehicle, and the slits 3a and 3b are provided rearwardly of the position of the ashtray 1 in the vehicle. A center upper panel 6 is connected to an upper portion of the center lower panel 3. An instrument panel is formed from the center lower panel 3 and the center upper panel 6.

Figure 3:
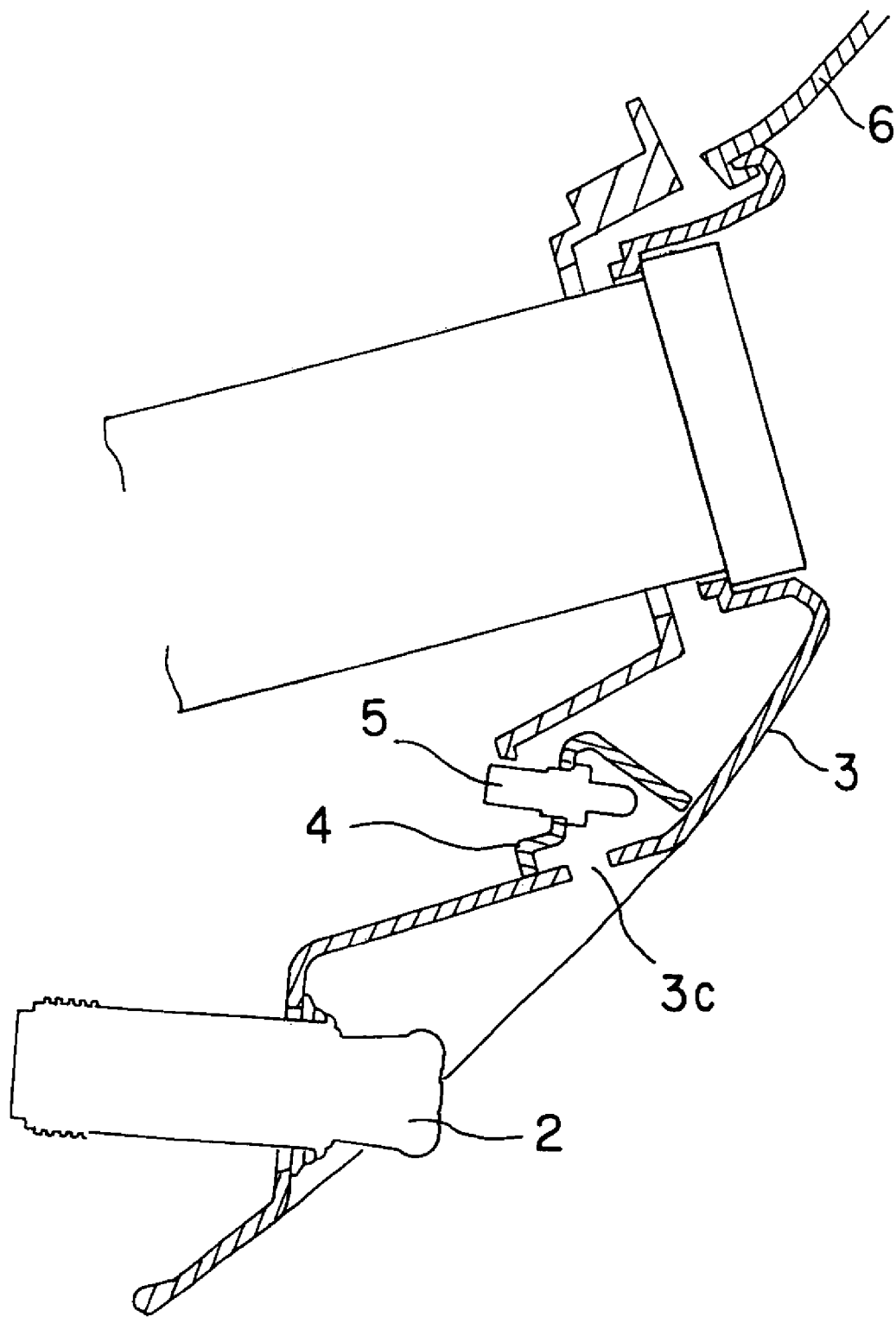
FIG. 3 is a sectional view taken on line B-B in FIG. 1.

Similarly, a section of the center lower panel 3 in the vicinity of the cigar lighter 2 is of a shape having convexities and concavities, as shown in FIG. 3. The cigar lighter 2 is installed at a position concave toward the front of the vehicle, and the slit 3c is provided rearwardly of the cigar lighter 2 in the vehicle. Moreover, the slit 3c is provided directly below the bulb 5 and, when the bulb 5 is lit, its direct light is projected through the slit 3c.

Figure 4:
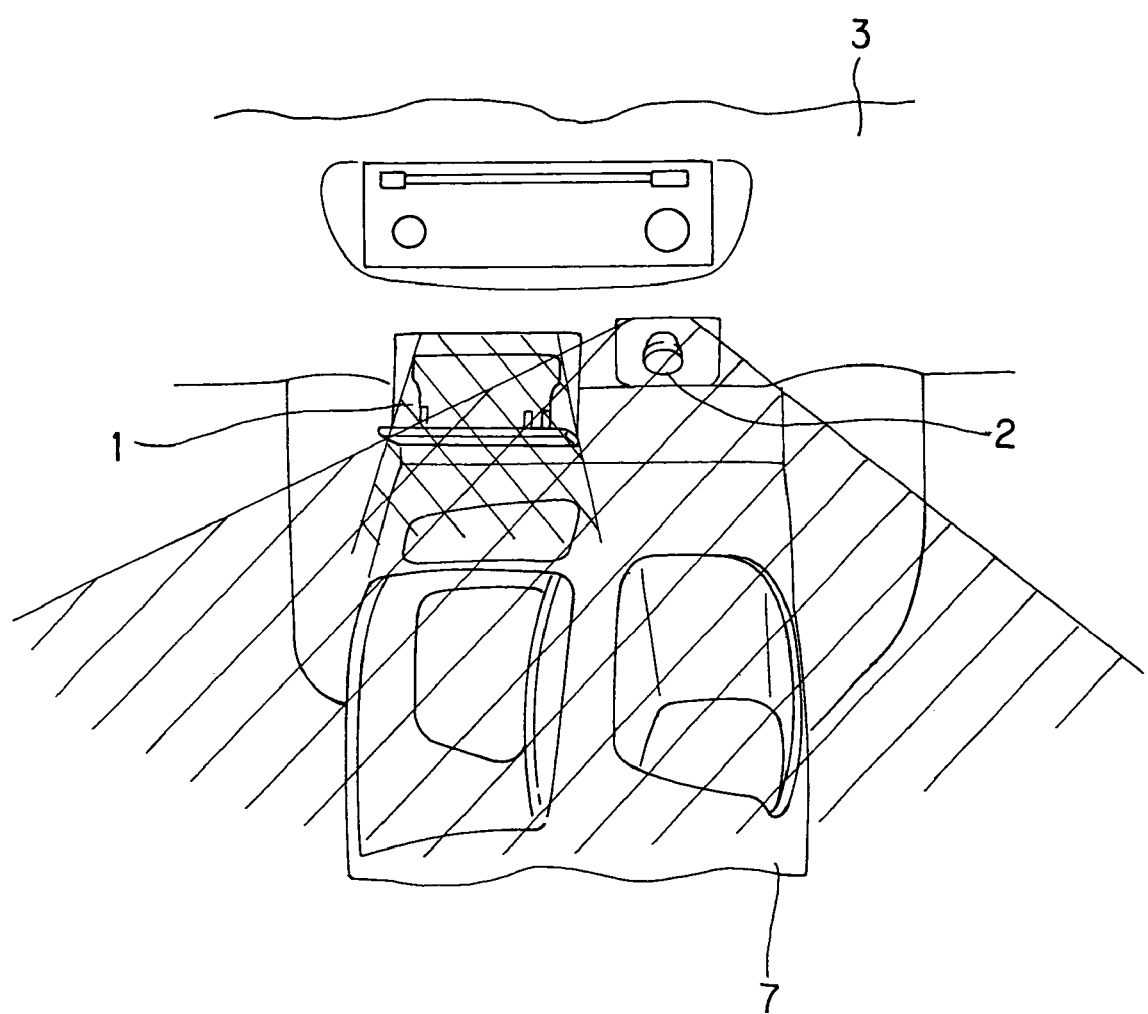
FIG. 4 is a schematic view showing the configuration of the embodiment of the present invention.

As shown in FIG. 4, a console 7 is provided, below the ashtray 1 and the cigar lighter 2, to extend toward the rear of the vehicle. According to the present embodiment, when the bulb 5 is lit, direct light of the bulb 5 is thrown onto zones near the cigar lighter 2 and the console 7 through the slit 3c. Since the interior of the bulb case 4 is white, rather than silver, illumination from the bulb 5 is diffusely reflected within the bulb case 4, and further fainter light is projected through the slits 3a, 3b and 3c. The shaded portion in the drawing shows an example of a range irradiated with light from the bulb 5 via the slits 3a, 3b and 3c. Such an irradiated range is not limited to the illustrated range, but can be adjusted depending on the positions and shapes of the slits.

If the ashtray 1 is not used, namely, the ashtray 1 is closed, for example, a handle 1a of the ashtray 1 is dimly lit with reflected light which has leaked, whereas the neighborhood of the cigar lighter 2 and the console 7 is lit with direct light from the bulb 5. On the other hand, when the ashtray 1 is used, namely, the ashtray 1 is opened, light thrown through the slit 3c illuminates a stubbing-out portion of the ashtray 1 and its surroundings in addition to the neighborhood of the cigar lighter 2 and the console 7.

When the interior and exterior of the vehicle compartment are dark, and the light is on, such as in the nighttime, therefore, the lighting of the bulb 5 always illuminates the ashtray 1, the cigar lighter 2, and the console 7 through the slits 3a, 3b and 3c. In this manner, a single light source can serve as lighting for all of the ashtray 1, the cigar lighter 2, and the console 7. Furthermore, a member, such as the lighting ring hitherto provided in the cigar lighter 2, becomes unnecessary. Thus, the simplification of the configuration and the reduction of cost can be achieved.

Besides, unlike the conventional lighting, lighting for the neighborhood of the console 7 in the vehicle compartment is always provided. Thus, a subdued, relaxing lighting is imparted, resulting in enhanced marketability. Furthermore, the bulb 5 is provided above the slit 3c, whereby direct light from the bulb 5 can always illuminate the cigar lighter 2 and the console 7 through the slit 3c, regardless of whether the ashtray 1 is used or not.

The invention thus described, it will be obvious that the same may be varied in many ways. For example, the reason why the two slits are provided above the ashtray 1 is that the strength of the center lower panel 3 is maintained by this arrangement. However, the width and length of the slit 3a, 3b or 3c may be set as desired, whereby the range of irradiation with light or the illuminance can be adjusted. Moreover, the painting on the inner surface of the bulb case 4 is not limited to a white color, but may be in such a color that reflected light from the lighting of the bulb 5 can be obtained as desired. In the drawings, moreover, the slits 3a, 3b and the slit 3c are different in position in the longitudinal direction of the vehicle. The reason for this is that the slits 3a and 3b are provided at such a position that the neighborhood of the handle 1a of the ashtray 1 can be lit. The positions of the slits 3a, 3b and 3c may be set as required. Also, the shape and number of the slit 3c shown in FIG. 1 are an example, and there may be shapes and numbers other than those illustrated. Additionally, in the present embodiment, the bulb 5 is provided directly above the slit 3c, but the bulb 5 may be provided directly above the slit 3a or the slit 3b. Such variations are not to be regarded as a departure from the spirit and scope of the invention, and all such modifications as would be obvious to one skilled in the art are intended to be included within the scope of the following claims.

The invention claimed is:

1. A vehicle interior lighting system, comprising:
   an instrument panel having a first concave portion, the first concave portion containing a draw-type ashtray and a second concave portion, provided independently from the first concave portion, the second concave portion containing a fixed-type cigar lighter placed parallel with the draw-type ashtray in a vehicle width direction;
   a light emitter;
   a bulb case extending in the vehicle width direction on a rear surface of the instrument panel above the first concave portion and the second concave portion, and accommodating the light emitter; and
   a first slit provided in the first concave portion and above the ashtray, the first slit emitting light from the bulb case to illuminate a handle of the ashtray when the ashtray is closed and to illuminate a stubbing-out portion of the ashtray when the ashtray is opened; and
   a second slit provided in the second concave portion and above the cigar lighter, the second slit emitting light from the bulb case to illuminate the cigar lighter and an interior of a vehicle regardless of a position of the ashtray.

2. The vehicle interior lighting system according to claim 1, wherein an inner surface of the bulb case diffusely reflects light thrown from the light emitter.

3. The vehicle interior lighting system according to claim 1, wherein the interior of the vehicle is a console.

4. The vehicle interior lighting system according to claim 1, further comprising:
   a third slit provided in the first concave portion and above the ashtray and adjacent the first slit, the third slit emitting light from the bulb case to illuminate the handle of the ashtray when the ashtray is closed and to illuminate the stubbing-out portion of the ashtray when the ashtray is opened.

5. The vehicle interior lighting system according to claim 1, wherein the light emitter is disposed above the second slit.

6. The vehicle interior lighting system according to claim 1, further comprising:
   a console that extends along a longitudinal direction of the vehicle,
   wherein the console is illuminated by light emitted from the second slit regardless of the position of the ashtray.

* * * * *